(12) United States Patent
Nishiwaki et al.

(10) Patent No.: US 7,807,940 B2
(45) Date of Patent: Oct. 5, 2010

(54) LASER PROCESSING APPARATUS AND LASER PROCESSING METHOD

(75) Inventors: Masayuki Nishiwaki, Yoshikawa (JP); Junichiro Iri, Yokohama (JP); Genji Inada, Kawasaki (JP); Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 11/283,262

(22) Filed: Nov. 17, 2005

(65) Prior Publication Data

US 2006/0108339 A1    May 25, 2006

(30) Foreign Application Priority Data

Nov. 19, 2004   (JP) .............................. 2004-335395

(51) Int. Cl.
    *B23K 26/14* (2006.01)
(52) U.S. Cl. ..................... 219/121.67; 219/121.72; 219/121.78
(58) Field of Classification Search ............ 219/121.67, 219/121.66, 121.78, 121.68, 121.85, 121.6, 219/121.72
    See application file for complete search history.

(56) References Cited

U.S. PATENT DOCUMENTS

| | | | | |
|---|---|---|---|---|
| 3,769,963 | A * | 11/1973 | Goldman et al. ............ | 600/476 |
| 5,597,590 | A * | 1/1997 | Tanimoto et al. .......... | 425/174.4 |
| 5,864,430 | A * | 1/1999 | Dickey et al. .............. | 359/559 |
| 6,943,086 | B2 * | 9/2005 | Hongo et al. ............... | 438/308 |
| 2004/0002199 | A1 * | 1/2004 | Fukuyo et al. ............. | 438/460 |
| 2005/0006361 | A1 * | 1/2005 | Kobayashi et al. ..... | 219/121.73 |
| 2005/0173387 | A1 | 8/2005 | Fukuyo | |
| 2005/0181581 | A1 | 8/2005 | Fukuyo | |
| 2005/0184037 | A1 | 8/2005 | Fukuyo | |
| 2005/0189330 | A1 | 9/2005 | Fukuyo | |
| 2005/0194364 | A1 | 9/2005 | Fukuyo | |

FOREIGN PATENT DOCUMENTS

| | | |
|---|---|---|
| JP | S51-113596 A | 10/1976 |
| JP | H01-186293 A | 7/1989 |
| JP | H01-313195 A | 12/1989 |
| JP | 2002-192370 A | 7/2002 |
| JP | 2002-205180 A | 7/2002 |
| JP | 2004-188422 A | 7/2004 |

* cited by examiner

*Primary Examiner*—M. Alexandra Elve
(74) *Attorney, Agent, or Firm*—Canon USA Inc IP Division (57) ABSTRACT

A laser processing apparatus, in accordance with at least one exemplary embodiment, is configured to contemporaneously perform the functions of observing a surface of a substrate and concentrating laser light to a given position inside the substrate. The laser processing apparatus can include an optical system having an afocal optical subsystem configured to concentrate laser light inside the substrate. Adjustment of the position of a laser light concentrating point can be achieved independent of adjustment of a focal point by the automatic focusing mechanism to observe the surface of the substrate irradiated with laser light.

6 Claims, 9 Drawing Sheets

LASER PROCESSING APPARATUS AND LASER PROCESSING METHOD

BACKGROUND OF THE INVENTION

1. Field of the Invention

The present invention relates to a laser processing apparatus and a laser processing method. The present invention relates more particularly, although not exclusively, to a laser processing apparatus and a laser processing method which are adapted to concentrate laser light into a material to be cut.

2. Description of the Related Art

There are various techniques for separating a surface of a material, which is to be cut, into a plurality of areas. For example, a blade dicing method adapted to rotate a circular blade, which has a width ranging from tens μm to hundreds μm, at a high speed to cut a semiconductor substrate, (e.g., a silicon wafer), into semiconductor chips is known. Note that the substrate is abraded by abrasives provided on the surface of the blade that cuts the substrate. Coolant water is sprayed onto a cutting surface to reduce heat generation and abrasion associated with the cutting of the substrate. However, dusts, (e.g., chips produced by cutting the substrate itself), fine particles of abrasives, and particles of adhesive of an adhesive tape used to fix the substrate and a processing table, get mixed into the coolant water and are widely scattered. Especially, in a case where the substrate is a semiconductor substrate, many minute function elements are formed on a surface of the substrate. Thus, there is a fear that dust can seriously contaminate and affect the reliability of the function elements.

To facilitate solving this problem, the cutting of a substrate can be performed in a dry environment without using coolant water. Thus, a processing method of cutting the substrate by concentrating laser light, having a wavelength, at which the laser light is highly absorbed by the substrate, onto a surface of the substrate can be used. However, this method has drawbacks where parts of the surface of the substrate, which surround a cut part, are thermally melted. The thermal damage can result in damaged logic circuits generated from the substrate. Additionally problems due to dusts still occur, from dust produced by resolidification of melted materials which adhere to the surface of the substrate.

Japanese Patent Application Laid-Open Nos. 2002-192370 and 2002-205180 discuss examples of a processing method of cutting a substrate by concentrating highly absorbable laser light into a substrate. These methods employ an internal processing region formed by concentrating laser light having a specific wavelength, at which the laser light has high permeability for the substrate, into the substrate as a starting point for cutting the substrate. Thus, no melted regions are formed on the surface of the substrate. Consequently, these methods enable dust-reduced cutting.

The laser light used to form such a modified layer is concentrated into the substrate through a microscope objective lens used for processing-position observation. Laser processing is performed by simultaneously causing an actuator, (e.g., a stage actuator), to drive the substrate along a predetermined cutting line while maintaining the concentrated condition of the laser light.

However, according to the aforementioned method, to accurately cut the substrate, which is an example of the material to be cut, along a predetermined cutting line on the surface of the substrate, laser light can be concentrated into that part of the substrate which is located just under the predetermined cutting line. To that end, one can keep observing a state in which laser light is irradiated onto the surface of the substrate, by using the microscope objective lens even during the laser processing. However, because the microscope objective lens is also used to concentrate laser light to a concentrating position inside the substrate, the microscope objective lens can simultaneously perform both the functions of observing the surface of the substrate and concentrating laser light onto a given position inside the substrate. In this regard, Japanese Patent Application Laid-Open No. 2004-188422 discusses an apparatus adapted to concentrate both of laser light for focusing and laser light for processing to the surface of an object to be processed, by using the same condenser lens, which faces the surface of the object. However, in the apparatus discussed therein, when the condenser lens is moved during focusing, the focal position of laser light for processing can be displaced.

To maintain an irradiating position of laser light at a given position inside a substrate, it is required that a processing system processes the surface of the substrate, which takes into consideration the deformation of a pedestal under the substrate and the distortion of the substrate. In this case, usually, a predetermined laser processing is performed by using an automatic focusing mechanism to focus the microscope objective lens on the surface of the substrate. However, since the microscope objective lens is incorporated into the automatic focusing mechanism in this case, a laser light concentrating optical system cannot concentrate laser light to a given position inside the substrate during a period when the focal position of an observing optical system is being adjusted.

Especially, in a case where the substrate is a silicon wafer, there can sometimes be a misalignment between the predetermined cutting line and a laser light concentrating point that can be located just under the predetermined cutting line, due to an industrial error caused when the substrate and devices are formed. In this case, according to the aforementioned laser processing method, it is highly likely that a crack will deviate from the predetermined cutting line with the crack developing towards the surface of the substrate, which can result in damaged logic circuits. Furthermore such disparity between the desired cutting position and the actual crack formation can result in other structures being damaged. For example, in a device substrate of a liquid discharge head in which a discharge port, (e.g., an inkjet nozzle), is formed, an opening structure is adapted to supply liquid, (e.g., ink), under the discharge port. Disparities in the cutting can result in a crack that extends through such a structure, so that the device substrate becomes damaged.

SUMMARY OF THE INVENTION

At least one exemplary embodiment is directed to a laser processing apparatus and a laser processing method which are adapted to concentrate laser light into a material to be cut, thereby forming an internal processing region therein so as to facilitate the cutting of the material.

At least one exemplary embodiment is directed to a laser processing apparatus and a laser processing method, which can perform the functions of concentrating laser light to an optional position inside a substrate and observing a surface of the substrate (e.g., using a shared objective lens).

In at least one exemplary embodiment, a laser processing apparatus is configured to concentrate, when a material is cut, laser light to a light concentrating point at a predetermined depth inside the material from a surface of the material to form an internal processing region; including a first optical system having a laser light concentrating position adjustment device configured to concentrate laser light inside the material to form the internal processing region; a second optical system having an automatic focusing device used to observe the surface of the material; and an objective lens shared by the first optical system and the second optical system and configured to face the surface of the material. In the laser processing apparatus, the laser light concentrating position adjustment (e.g., by the laser light concentrating position adjustment device) and automatic focusing adjustment (e.g., by the automatic focusing adjustment device) can be performed independent of each other.

In at least one further exemplary embodiment, a laser processing method is configured to concentrate, when a material is cut, laser light to a light concentrating point at a predetermined depth inside the material from a surface of the material to forman internal processing region. A first optical system includes a laser light concentrating position adjustment device configured to concentrate laser light inside the material to form the internal processing region. A second optical system includes an automatic focusing device used to observe the surface of the material. An objective lens can be shared by the first optical system and the second optical system and can face the surface of the material. In the laser processing method, laser light concentrating position adjustment by the laser light concentrating position adjustment device and automatic focusing adjustment by the automatic focusing adjustment device can be performed independent of each other.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate at least a few exemplary embodiments.

FIGS. 2A to 2C are schematic explanatory views illustrating a substrate that is an example of a substrate processed according to at least one exemplary embodiment.

FIGS. 7A and 7B illustrate an internal crack formation step.

DETAILED DESCRIPTION OF THE EMBODIMENTS

The following description of exemplary embodiment(s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example certain lasers and optical lens systems may not be discussed in detail. However these systems and the methods to fabricate these system as known by one of ordinary skill in the relevant art is intended to be part of the enabling disclosure herein where appropriate.

Note that similar reference numerals and letters refer to similar items in the following figures, and thus once an item is defined in one figure, it can not be discussed for following figures.

Exemplary embodiments will be described in detail below with reference to the drawings. However, the dimensions, materials, shapes and relative positions of the constituent parts shown in the exemplary embodiments can be changed as convenient depending on various conditions and on the structure of the apparatus adapted to exemplary embodiments, and the invention is not limited to the exemplary embodiments described herein.

A substrate 10, which is an example of a material to be cut, is described below with reference to FIG. 1.

Laser light can be concentrated to a light concentrating point at a predetermined depth inside the substrate 10 from a surface 11 thereof to thereby form an internal processing region A (for example, a melted region, a cracked region, or a region whose crystalline structure is changed), which does not reach the substrate surface 11. In this case, internal cracks 12 (12a to 12c) are formed. A laser processing apparatus according to at least one exemplary embodiment is configured so that, the adjustment of a light concentrating position, at which laser processing is performed, and the automatic focusing adjustment of a position, at which a surface observation is performed, can be achieved independent of each other. Additionally, the laser processing of a predetermined part in the substrate 10 and the observation of the surface 11 by automatic-focusing can simultaneously be performed by using one objective lens. Consequently, a laser processing position and an observation position can optionally be set. Thus, internal laser processing is performed on a part inside the substrate, which is located just under a predetermined cutting line 11a. For example, an internal processing region is formed inside the substrate by laser processing.

An optical system, through which laser light is irradiated to form the internal processing region, includes an afocal optical subsystem. A lens constituting the afocal optical subsystem can be displaced in the direction of an optical axis of the afocal optical subsystem. Consequently, the power of the afocal optical subsystem can be changed to thereby change an angle of emergence of an emitted light ray. Thus, the laser light concentrating position in the substrate can optionally be set.

Figure 2A:
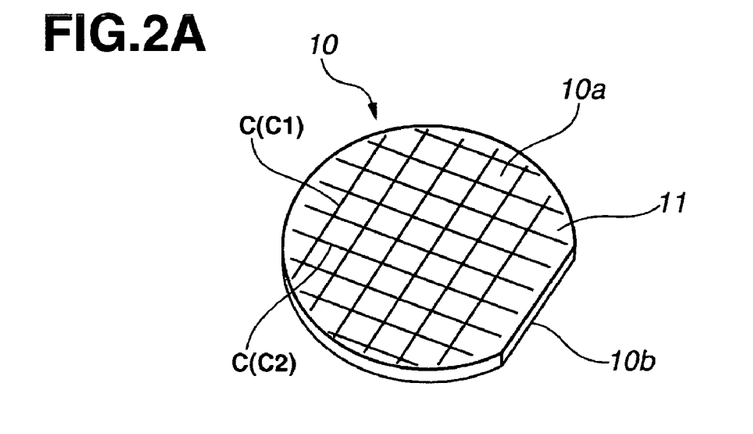
FIG. 2A illustrates a perspective view of the substrate.
Figure 2B:
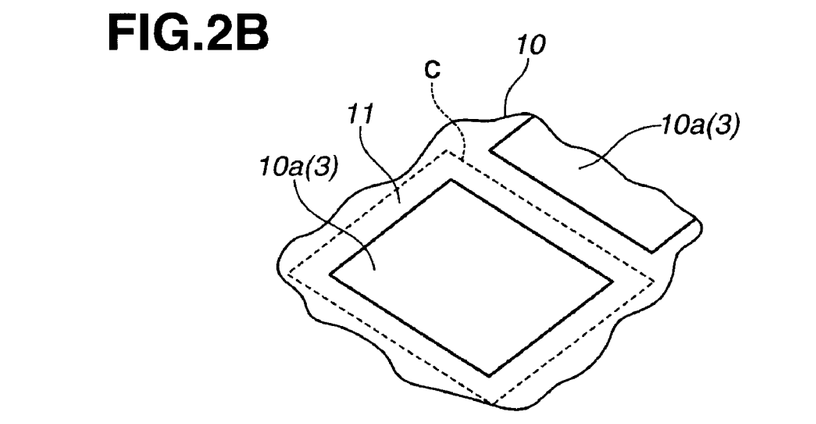
FIG. 2B illustrates a partly enlarged perspective view of the substrate shown in FIG. 2A.
Figure 2C:
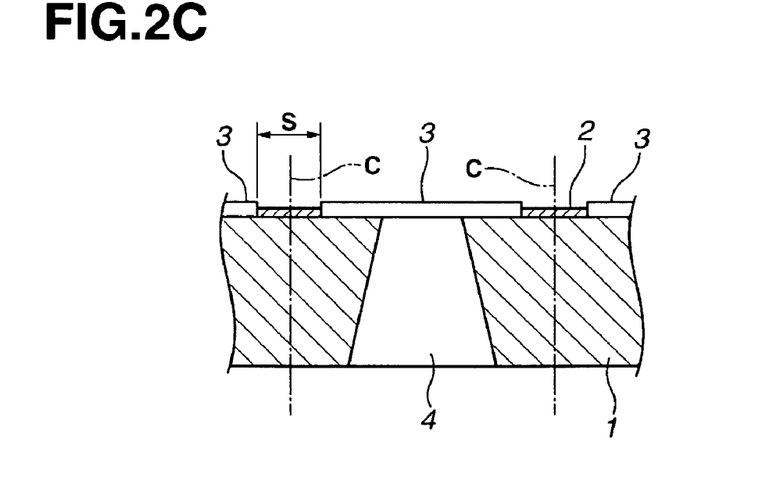
FIG. 2C illustrates a partly cross-sectional view of the substrate shown in FIG. 2B.

FIGS. 2A to 2C illustrate an example of the substrate according to at least one exemplary embodiment, (e.g., a silicon substrate including a silicon wafer), on a surface (e.g., of which many inkjet head chips are formed in a grid). The substrate 10 (e.g., silicon) having a thickness (e.g., of 625 μm) shown in FIGS. 2A and 2B is configured so that a film 2 having a thickness (e.g., of about 1 μm) is formed on the Si surface of a silicon wafer 1, as shown in FIG. 2C. An epoxy resin structure serving as a nozzle layer 3, incorporating devices adapted to discharge a liquid (e.g., ink), a logic element adapted to drive these devices, and wiring, is disposed on the film 2 and constitutes each logic element portion 10a.

A liquid supply port (ink supply port) 4 serving as an opening portion is formed just under each of the nozzle layers 3, which incorporates the liquid discharge devices and so on, (e.g., formed by anisotropic etching of the silicon wafer 1) The nozzle layers 3 are disposed across each of the predetermined cutting lines C so that the silicon wafer 1 can be cut into device chips in the final stage of a manufacturing process. Each of the cutting lines C is formed along a crystal orientation of the silicon wafer 1. The interval S between the adjacent nozzle layers 3 can vary (e.g., about 400 μm at minimum).

Figure 3:
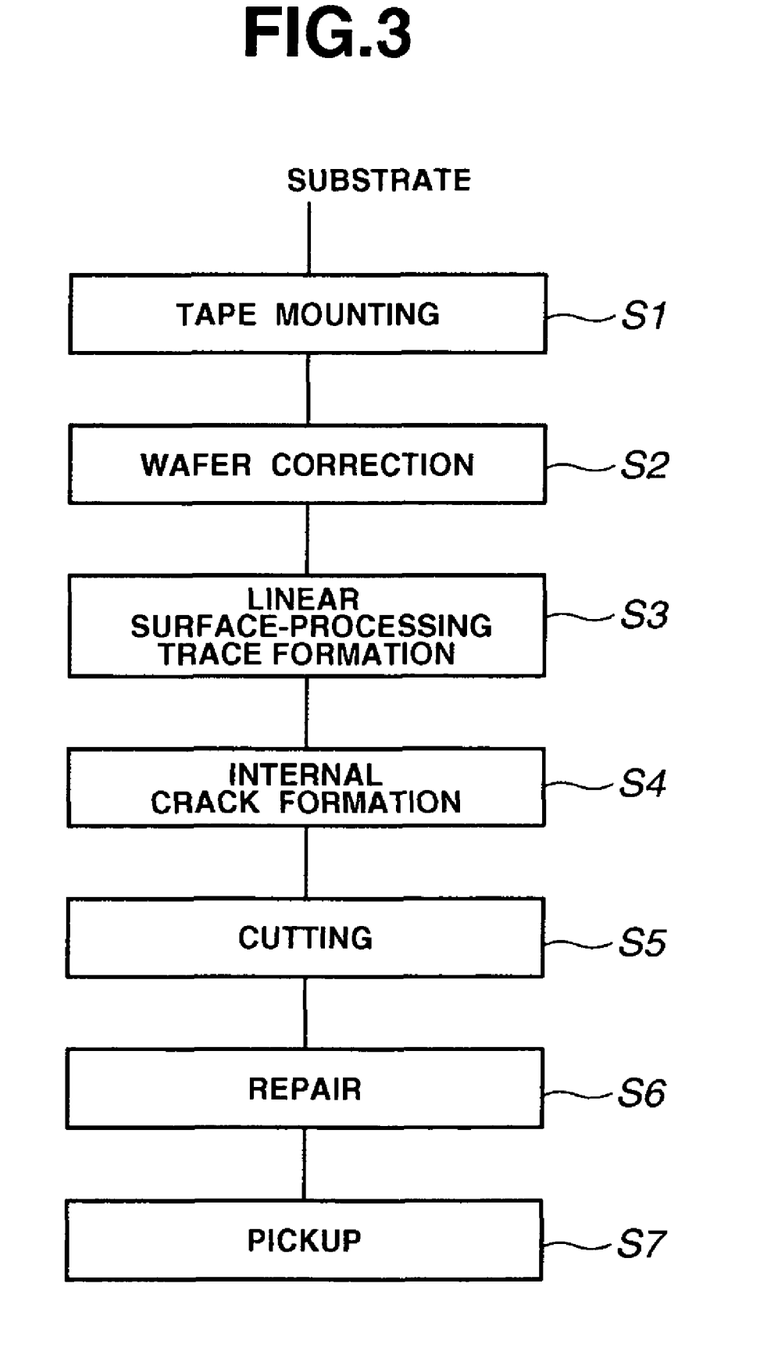
FIG. 3 is a flowchart illustrating a cutting process according to at least one exemplary embodiment.

FIG. 3 is a flowchart illustrating a cutting process for separating the substrate 10 into the logic element portions 10a serving as individual device chips. This process includes seven steps, that is, a tape mounting step S1, a wafer correction step S2, a linear surface-processing trace formation step (or a surface processing step) S3, an internal crack formation step (or an internal processing region formation step) S4, a cutting step S5, a repair step S6, and a pickup step S7. Hereinafter, each of the steps S1 to S5, that is, the tape mounting step to the cutting step, is described.

Tape Mounting Step

Figure 4:
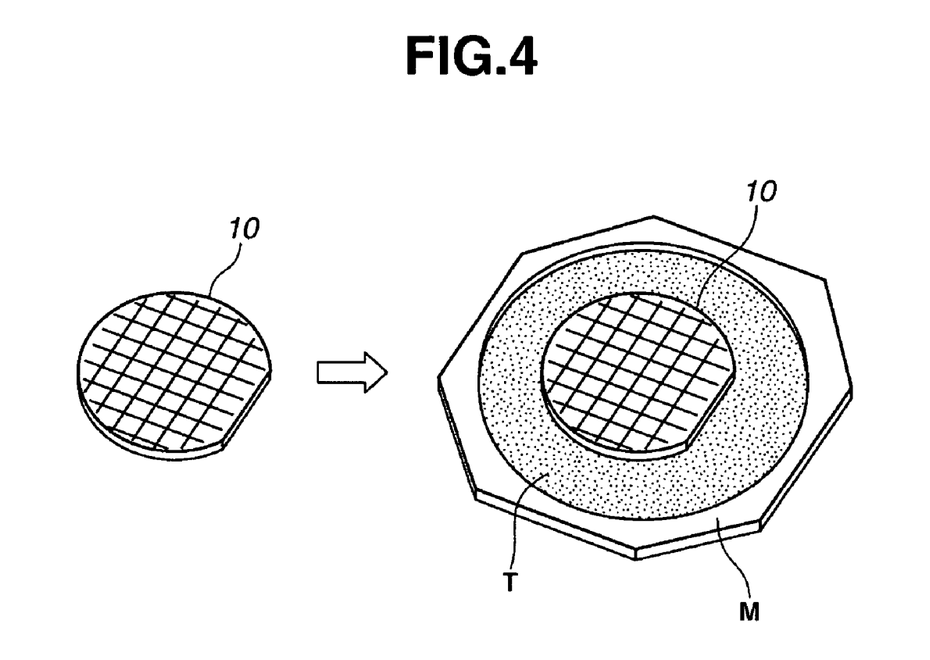
FIG. 4 is an explanatory view illustrating a tape mounting step.

First, as shown in FIG. 4, tape mounting is performed on the substrate 10 to reduce the occurrence of the substrate 10 from being separated into devices prior to the cutting step. The tape mounting is performed by sticking a dicing tape T, to which a dicing frame M is stuck, to the back surface of the substrate 10. An adhesive tape coated with an ultraviolet curing adhesive or with a pressure-sensitive adhesive, or an adhesive tape having a self-adhesive layer can be used as the dicing tape T, or any other similar dicing tape system as known by one of ordinary skill in the relevant art.

Wafer Correction Step

Figure 5A:
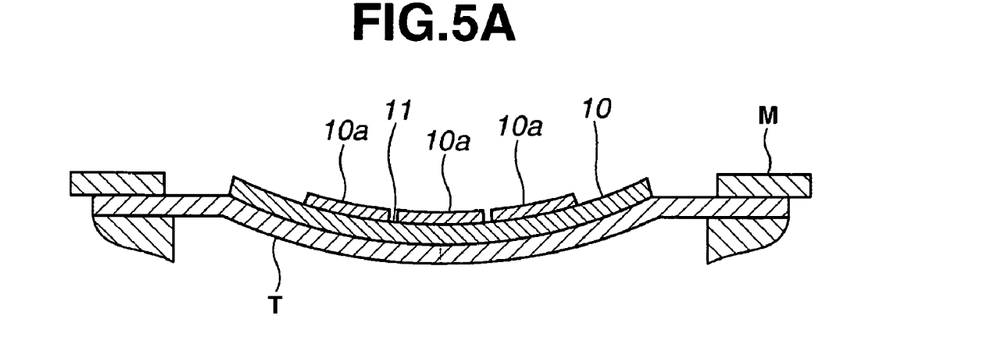
FIGS. 5A and 5B are explanatory views illustrating a wafer correction step.
Figure 5B:
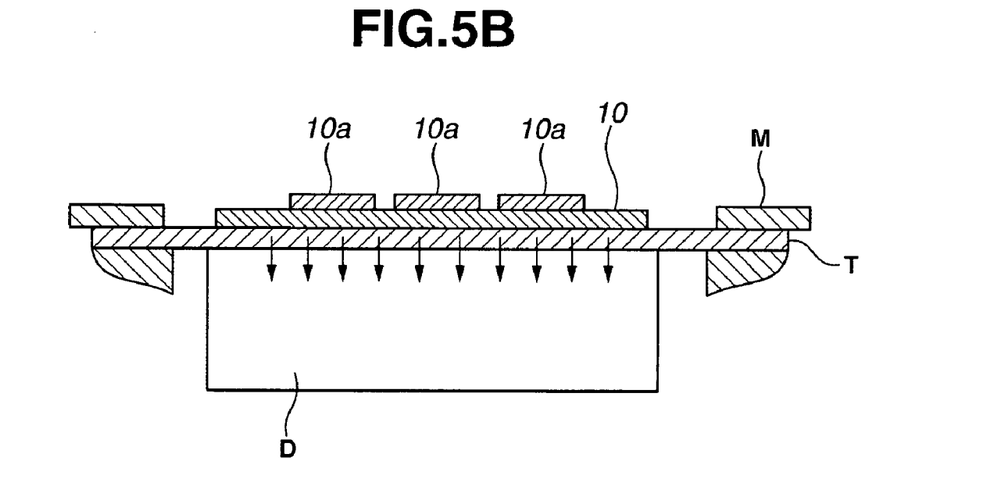

The nozzle layer 3 serving as a layer (e.g., a resin layer) formed on the surface of the substrate 10 as described above can thermally contract when hardened. Thus, the entire substrate 10 can be deformed as shown in FIG. 5A. When laser light irradiates, as will be described later, the substrate 10 in this deformed state, angles of incidence of laser light locally vary on the substrate surface 11. Thus, the substrate 10 cannot be processed with good accuracy. Accordingly, one can reduce this deformation in advance. Thus, as shown in FIG. 5B, the substrate 10 is sucked from the side of the dicing tape T by a suction stage D. Consequently, the substrate 10 is planarized to thereby reduce the deformation.

Linear Surface-Processing Trace Formation Step

Subsequently, to cut the substrate 10 into logic element portions 10a with good accuracy, concave surface-processing traces 11a (FIG. 6) for causing crack propagation along the predetermined cutting lines C can be formed in the film surface 11b. The formation of the surface-processing traces 11a along the predetermined cutting lines C results in occurrence of stress concentration in the cutting step to be performed later by using an external force. Consequently, a crack is led to the surface-processing trace 11a. In addition, the surface-processing trace 11a serves as a starting point from which a crack develops into the substrate 10. Therefore, the occurrence of unnecessary cracks, which would break down the logic circuits, are reduced.

Figure 6:
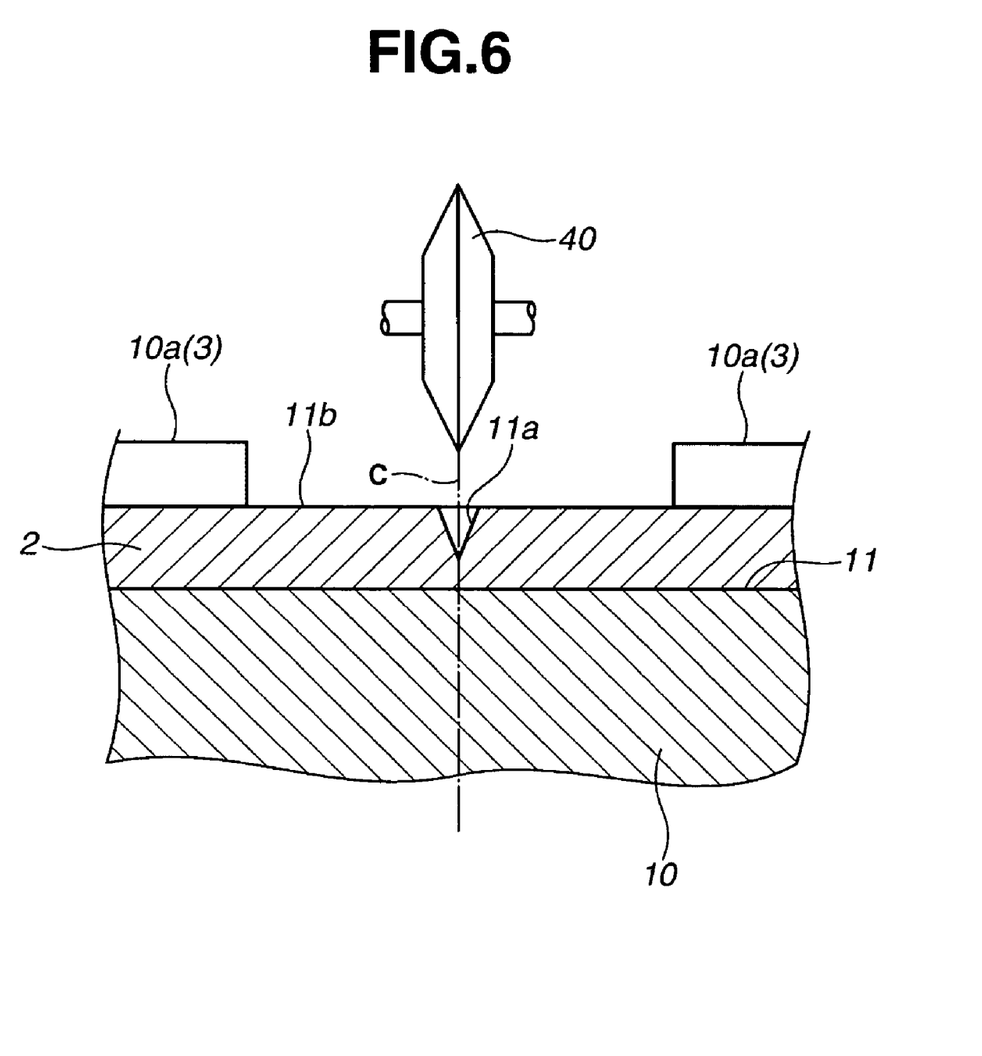
FIG. 6 is an explanatory view illustrating a linear surface-processing trace formation step in which a linear surface-processing trace is formed.

The formation of the surface-processing traces 11a is performed by using a scriber, (e.g., a tool 40 provided with a superhard blade or a diamond blade), to mark off the surface of the film 2 (e.g., an oxide film) along the predetermined cutting line C. In at least one exemplary embodiment, each of the surface-processing traces 11a is formed so that the width is equal to or more than a chosen amount (e.g., about 2 μm), and that the depth is equal to or more than a second chosen amount (e.g., about 1 μm). However, one can set the size of the surface-processing trace 11a so that the trace 11a does not interrupt an optical path of laser light L (FIG. 8) which is used to form the internal cracks 12 (FIG. 1). A depth at which stress concentration is caused between the surface-processing trace 11a and the crack is suitable as a processing depth. As illustrated in FIG. 6, this processing depth can be less than the thickness of the film 2, which is a surface layer on the substrate 10. Even in a case where the processing depth is equal to or more than the thickness of the film 2, there is no problem.

The surface-processing trace 11a can be formed on at least the film surface 11b having the logic element portions 10a. However, the surface-processing traces 11a can be formed on both of the front surface 11 and the back surface 11c (FIG. 1) of the substrate 10.

In a case where the surface-processing trace 11a is formed by marking processing using a tool, in at least one exemplary embodiment, the formation of the surface-processing trace 11a is performed prior to the internal crack formation step, which will be described in detail later. Thus, unnecessary cracks due to a processing load can be reduced. Also, the surface-processing trace 11a can be used as a reference line, which indicates a processing position during irradiation of laser light in the later step, by forming the surface-processing trace 11a in the preceding step. Consequently, the working efficiency of the irradiation of laser light can be enhanced.

The surface-processing trace 11a can be formed after the internal crack formation step (the internal processing region formation step) is performed using laser light L. In this case, when an internal crack is formed, there is no influence of shading of laser light. Thus, the internal crack can be formed more efficiently. The expression "influence of shading of laser light" indicates a reduction in amount of laser light reaching the inside of the substrate, which is caused by reflection of laser light irradiated onto the concave inclined surface on which the surface-processing traces 11a are formed.

Internal Crack Formation Step

Figure 1:
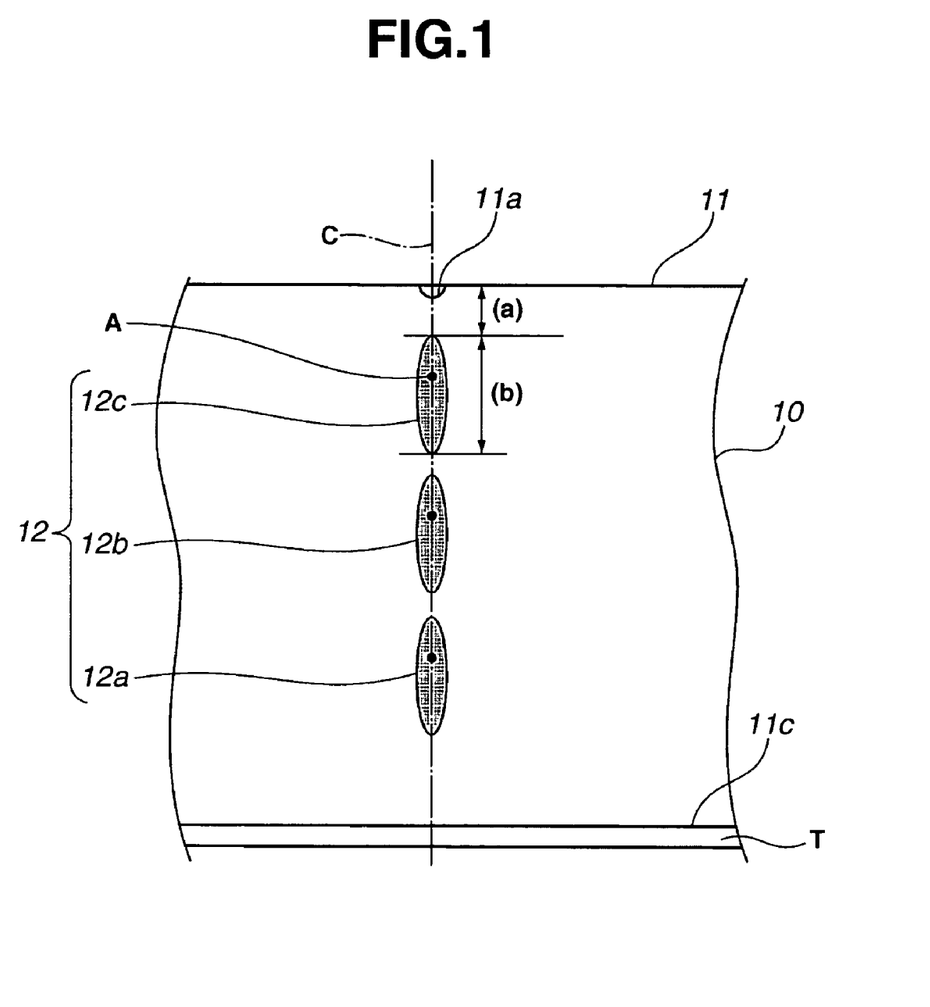
FIG. 1 is a schematic view illustrating cracks inside a substrate processed according to an exemplary embodiment.
Figure 7A:
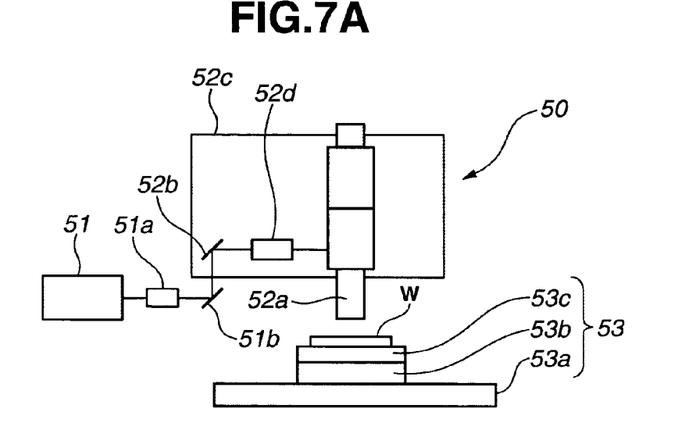
FIG. 7A is a schematic view illustrating a processing apparatus configured to irradiate a substrate with a laser light.

The internal cracks 12 shown in FIG. 1 are formed by using a processing apparatus 50 shown in FIG. 7A. The processing apparatus 50 includes a light-source optical system (51, 51a, and 51b), a laser light concentrating optical system (52a, 52b, 52c, and 52d), an automatic stage mechanism 53 (53a, 53b, and 53c), and an alignment optical system. The light-source optical system has a light source 51, a beam expanding subsystem 51a, and a mirror 51b. The laser light concentrating optical system has a microscope objective lens 52a, a mirror 52b, an automatic focusing device 52c, and an afocal optical subsystem 52d. The automatic stage mechanism 53 has an X-stage 53a, a Y-stage 53b, and a micromotion adjustment stage 53c. The alignment optical system is adapted to perform alignment by using an orientation flat 10b (see FIG. 2A) of the substrate 10 serving as a workpiece W. Note that other alignment methods can be used (e.g., alignment holes) and the discussion herein should not be interpreted to limit alignment using an orientation flat surface. Fundamental waves having a wavelength of 1064 nm, which are outputted from a pulse YAG laser, can be used as laser light provided from the light source 51. The pulse width of the fundamental waves can range from about 15 ns to about 1000 ns. The frequency thereof ranges from 10 kHz to 100 kHz. Note that although the illustrative example discusses YAG lasers, particular wavelengths, and pulse widths, these are non limiting examples only, and thus exemplary embodiments can use other laser systems, wavelengths, and pulse widths.

Figure 7B:
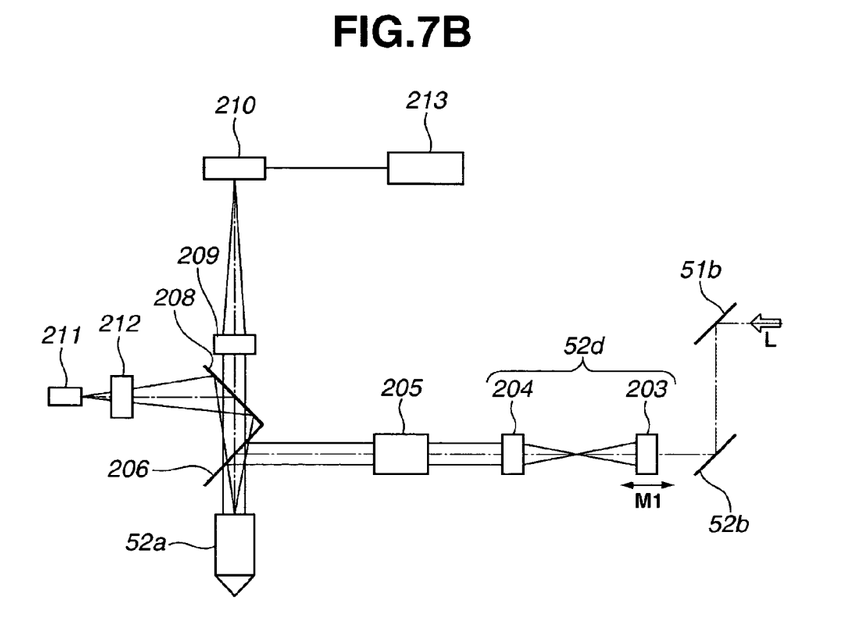
FIG. 7B is a schematic view illustrating an optical system of a processing apparatus in accordance with at least one exemplary embodiment.

FIG. 7B is a schematic view illustrating the details of the laser light concentrating optical system of the processing apparatus 50.

Processing laser light L supplied from a laser (e.g., YAG laser) is reflected by the mirrors 51*b* and 52*b* and then passes through the afocal optical subsystem 52*d* including lens units 203 and 204. The mirrors 51*b* and 52*b* can perform operations independent of each other. For example, the mirror 52*b* can perform micro motions in conjunction with other optical devices.

First, light beams are incident on the afocal optical subsystem 52*d* in parallel to the optical axis of the lens unit 203 of the afocal subsystem 52*d*. Subsequently, the afocal subsystem 52*d* outputs the light beams from the lens unit 204 in parallel to the optical axis of the lens unit 204. The lens unit 203 can perform micromotions in the direction of the optical axis thereof. The light beams outputted from the lens unit 204 can be controlled by the motion M1 of the lens unit 203 to change angles of emergence thereof either in a convergent direction or in a divergent direction. Consequently, a light concentrating position at which the laser light L is concentrated can be controlled.

The light beams outputted from the lens unit 204 pass through a correction lens 205. In at least one exemplary embodiment, the objective lens 52*a* is a tool adapted to observe the surface of a material in the air. Thus, the objective lens 52*a* may not be an optimal device for concentrating light inside a material (e.g., silicon). To optimally concentrate light inside the material by using an ordinary microscope objective lens, the correction lens 205 can be used. Light beams outputted from the correction lens 205 pass through a dichroic mirror 206 and reaches the objective lens 52*a*. The laser light L is concentrated by the objective lens 52*a* to the center of a visual field.

The observing optical system can be configured so that light emitted from an illuminating light source 211 passes through a lens 212, a half-mirror 208, the dichroic mirror 206, and the objective lens 52*a* and illuminates the substrate surface (a processing surface). Since a surface of emergence of the illuminating light source 211 and an entrance pupil of the objective lens 52*a* are conjugate with each other, the observing optical system can constitute a Kohler illumination system. Note other types of illumination systems can be used, and the reference to a Kohler illumination system is for illustrative non limiting purposes.

The objective lens 52*a* and an imaging lens 209 can constitute an infinity microscope system. A camera 210 and a surface of the substrate which is irradiated with laser light can be made by the action of the two lenses 52*a* and 209 to be conjugate with each other. Thus, the light concentrating point of laser light used as the processing laser light L can be observed by the camera 210. In that case, the laser-light reflectance of an object to be observed can be noticed. Because the camera 210 and the surface of the substrate which is irradiated with the laser light L are conjugate with each other in a case where laser processing is performed by using the processing laser light L and a microscope, the camera 210 can be damaged depending on the reflectance of the substrate surface irradiated with the laser light L. Thus, a filter (not shown) adapted for the processing laser light L can be interposed between the objective lens 52*a* and the imaging lens 209. For example, when the material of the object is a high-refractive-index material, such as silicon, the reflectance of the object is about 30%. Thus, it is likely that the camera 210 can be damaged.

The focal point of the objective lens 52*a*, through which the processing laser light L is irradiated, and the light concentrating point (corresponding to an image formed by the lens unit 203 from incident light beams thereon) of the lens unit 203 of the afocal optical subsystem 52*d* are placed to be conjugate with each other. Thus, the light concentrating position, to which the processing laser light L is concentrated by the objective lens 52*a*, can be moved by causing the lens unit 203 to perform a micromotion M1 along the direction of the optical axis (that is, the direction of an optical path of the optical system adapted to form the internal processing region inside the substrate by the laser light). That is, the light concentrating position, to which the processing laser light L is concentrated by the objective lens 52*a*, can be changed by changing the power of the afocal optical subsystem 52*d*. Although the afocal optical subsystem 52*d* is constituted by using the lens units 203 and 204, in at least one exemplary embodiment, the afocal optical subsystem 52*d* can be an optical system constituted by three or more lens units.

The processing apparatus 50 also can have an optical system in which the surface irradiated with the laser light L concentrated by the objective lens 52*a* and the camera 210 are set by the automatic focusing device 52*c* (FIG. 7A) to be conjugate with each other. The automatic focusing device 52*c* can adjust the focal point by moving the entire optical system, which includes the objective lens 52*a*, the imaging lens 209, and the camera 210. This mechanism differs in configuration from the light concentrating point adjusting mechanism adapted to adjust the light concentrating point, to which the processing laser light is concentrated, by moving the lens unit 203 of the afocal optical subsystem 52*d* along the direction of the optical axis thereof. In at least one exemplary embodiment, an automatic focusing control unit 213 calculates an amount of displacement, using an image signal sent from the camera 210. According to a method using the image signal, it takes a relatively long time to adjust the focal point, as compared with a processing time. Thus, an automatic focus adjusting operation is performed once just before each scanning using laser light. The focal plane (corresponding to the substrate surface irradiated with laser light) of the camera 210 and the light concentrating position (corresponding to the position at which the internal processing region is formed inside the substrate), to which the processing laser light L is concentrated, can be set by the focusing and light-concentrating adjustment devices of the different optical systems, respectively. However, in at least one exemplary embodiment, first, the adjustment of the focal point corresponding to the substrate surface irradiated with laser light through the objective lens 52*a* is performed by using the automatic focusing control unit 213, between the adjustment devices of the different optical systems. Thereafter, while the positional relation (or the distance) between the objective lens 52*a* and the surface irradiated with laser light is maintained, the adjustment of the light concentrating position is performed by changing the power of the afocal optical subsystem 52*d* so as to concentrate the processing laser light L to the predetermined position, at which the internal processing region is formed, inside the substrate.

Although the device using an image signal sent from the camera 210 can be employed as the automatic focusing device 52*c*, in at least one exemplary embodiment, an active automatic focusing device using laser light can be employed as the automatic focusing device 52*c* serving as a focus adjusting unit.

Laser light to be selected is determined according to the spectral transmission factor of the substrate. Thus, any laser light of a wavelength region which can cause an intense electric field at the light concentrating point and has permeability for the substrate can be used.

A condenser lens which is applicable to the observation of the substrate surface using a microscope and is suitable for the internal processing of the substrate in consideration of the refractive index of substrate material can be used as the microscope objective lens 52a of the light concentrating optical system.

Optical conditions for processing the inside of the substrate are set to facilitate the presence of the cross-sectionally concave-shaped surface-processing traces 11a on the substrate surface 11 or the film surface 11b. Thus, the power of the optical system can be increased in consideration of energy loss of the processing laser light L. Alternatively, light beams impinging upon the substrate to avoid the surface-processing traces 11a can be selected. Consequently, light beams incident upon the substrate surface 11 are refracted in the substrate 10 and are concentrated to the light concentrating point A (see FIG. 1) at the predetermined depth (a) inside the substrate 10 to thereby produce the internal cracks 12 of depth extent (b).

At least one exemplary embodiment sets processing conditions according to the light concentrating position, the film composition of the film 2, the wavelength of laser light, and so on so that the top of the uppermost internal crack 12c shown in FIG. 1 is located a chosen distance away (e.g., about 10 μm) or more from the substrate surface 11. This condition is set to reduce a connection between the internal crack 12c and the substrate surface 11 from being improperly generated during processing and to reduce damage to the substrate surface 11 in some laser irradiating conditions.

The depth (a) of the light concentrating point A can be controlled by moving the workpiece W (FIG. 7A), which includes the substrate 10, and the laser light concentrating optical system (the processing optical system configured to form the internal processing region using laser light) in the direction of the optical axis to thereby displace the light concentrating position. However, at least one exemplary embodiment can be adapted so that the lens unit 203 of the afocal optical subsystem 52d of the laser light concentrating optical system can moved along the direction of the optical axis in consideration of the need to observe the substrate surface irradiated with laser light.

Let "n" denote a refractive index of the substrate 10 for laser light having a wavelength of 1064 nm. Let "d" designate an amount of mechanical displacement (that is, an amount of displacement of one of the substrate 10 and the laser light concentrating optical system when moved in the direction of the optical axis). Then, an amount of optical displacement of the light concentrating point A is given by "nd." The refractive index n of the substrate 10 using silicon is about 3.5 for laser light having a wavelength ranging 1.1 μm to 1.5 μm. The value of the refractive index n, experimentally measured, was close to 3.5. That is, in a case where the amount of mechanical displacement is 100 μm, the laser light concentrating point is formed at a depth of 350 μm from the substrate surface.

The refractive index close to 3.5 indicates that the reflectance of the silicon substrate is high. Generally, the reflectance of the substrate in the case of vertical incidence of laser light is given by $((n-1)/(n+1))^2$, so that the reflectance of the substrate is about 30%. The remaining energy reaches the inside of the substrate. However, in consideration of light absorption by the substrate itself, the final energy at the light concentrating point is reduced still more. According to a result of an actual measurement of the permeability of a silicon substrate having a thickness of 625 μm, the permeability of the silicon substrate was about 20%. Note that a silicon substrate is discussed herein for illustrative purposes, in exemplary embodiments the substrate can be made of various materials (e.g., SiO2, other substrate materials as known by one of ordinary skill in the relevant arts and equivalents).

When the laser light L is concentrated to the light concentrating point A, an internal processing region in which the property of the material of the substrate is partly modified is formed. In at least one exemplary embodiment, the crystal condition of the substrate included in a light concentrating part is changed. Consequently, the internal cracks 12 are formed. According to some experiments, in spite of differences due to stress applied to the light concentrating point A, cracks can develop in a direction in which the cracks run close to the substrate surface and in a direction in which the cracks run away from the substrate surface (that is, the direction of depth from the substrate surface). The lengths of the cracks can vary for example in the range from about 2 μm to about 100 μm.

Thus, the internal processing of the substrate in the direction of depth just under the predetermined cutting line C is performed by forming the internal cracks 12 from one point in the inside of the substrate 10 and subsequently causing the light concentrating point A to perform relative movement along the predetermined cutting line C and along the substrate surface.

As described above, the optical system having the laser light concentrating position adjustment device adapted to concentrate the laser light L to a given position inside the substrate to thereby form the internal processing region can have the afocal optical subsystem 52d and the objective lens 52a. The afocal optical subsystem 52d can have the lens units 203 and 204 serving as the laser light concentrating position adjustment devices. Also, at least one exemplary embodiment has the correction lens 205 and the mirror (dichroic mirror) 206. Although at least one exemplary embodiment can have the light source 51, the beam expanding subsystem 51a, and the mirrors 51b and 52b, these components do not relate directly to the laser light concentrating position adjustment.

The optical system having the automatic focusing device used to observe the substrate surface has an observation illumination system, the objective lens 52a, the imaging lens 209, and the camera 210, in addition to the automatic focusing device 52c. The automatic focusing device 52c can have a device configured to displace the entire optical system, which includes the objective lens 52a, the imaging lens 209, and the camera 210 with respect to the substrate 10, which serves as the workpiece W, either in an approaching direction or in a departing direction. In at least one exemplary embodiment, the observation illumination system can have the light source 211, the illuminating lens 212, and the half mirror 208.

The workpiece W, which is the substrate 10, is put on the automatic stage mechanism 53 configured to move in the X-direction and Y-direction, so that the position in the X-direction and the position in the Y-direction of the workpiece W can be adjusted. On the other hand, the position in the direction of the optical axis (that is, the direction of depth or the Z-direction) of the workpiece W can be adjusted by the automatic focusing device 52c serving as a Z-stage configured to move in the Z-direction to make the distance between the objective lens 52a and the workpiece W variable (z-axis is along a vertical line in FIG. 7A). The position in the direction of the optical axis of the workpiece W can be adjusted by adapting the automatic stage mechanism 53 to be able to displace in the Z-direction with the workpiece W loaded thereon. In this case, the displacement of the automatic focusing device 52c enables the displacement of the optical system connecting the afocal optical subsystem 52d and the objective lens 52a and the displacement of the optical system connecting the objective lens 52a and the camera 210 used to visually check an observation image to be simultaneously performed.

Next, the internal processing to be actually performed to form the internal processing region inside the substrate by using the laser light L is described below.

Referring first to FIG. 2A and FIG. 2B, the predetermined cutting lines C (FIG. 2B) on the substrate 10 include predetermined cutting lines C(C1) and C(C2), which are substantially orthogonal to each other with respect to the orientation flat 10b. When the internal processing is started, there are the following points to note.

Figure 8:
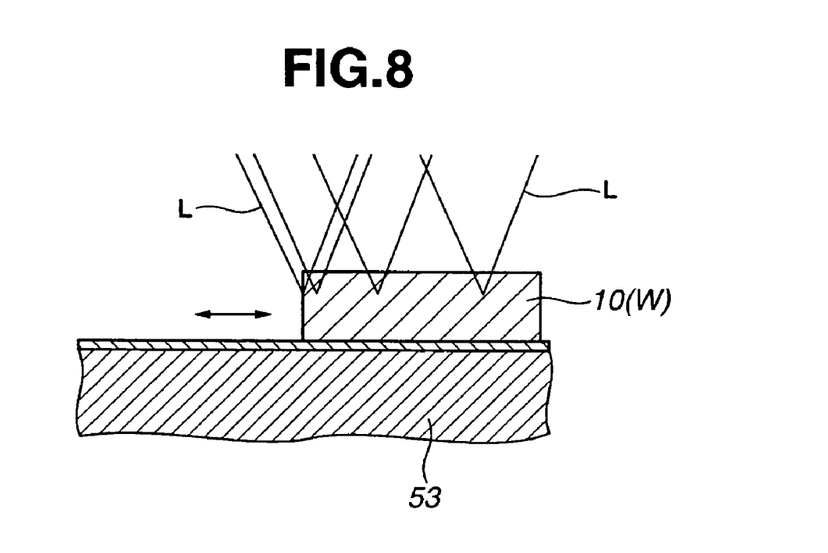
FIG. 8 is an explanatory view illustrating formation of an internal crack in an end portion of a substrate in the internal crack formation step.

As illustrated in FIG. 8, laser processing is started from an end point of the substrate 10 serving as the workpiece W. However, parts close to the end points of the substrate can be difficult to process, as compared with the central part of the substrate. Thus, when a part close to the end point is processed, it can be desirable to change the processing conditions. For instance, laser energy used for laser processing can be increased, as compared with laser energy needed for processing the central part of the workpiece W. At that time, according to at least one exemplary embodiment, the laser light L can be concentrated to a given position inside the substrate while the surface of the part close to the end point is observed through a favorable screen.

Figure 9:
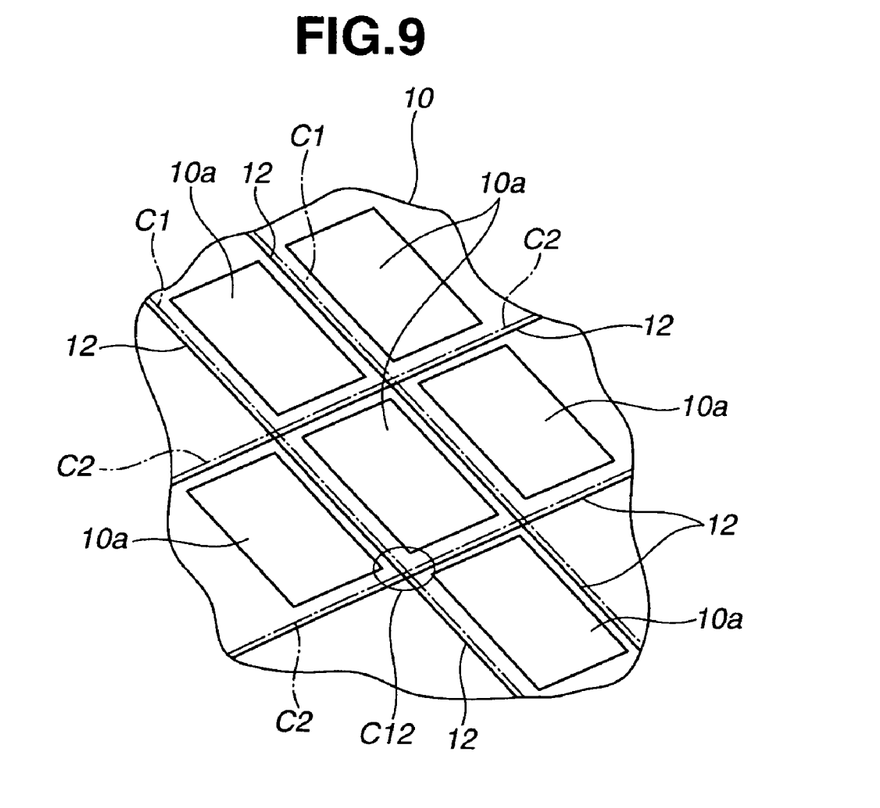
FIG. 9 is an explanatory view illustrating a case of cutting out special device chips in the internal crack formation step.

In a case where special chips (e.g., the rectangular regions 10a) are processed as shown in FIG. 9, in at least one exemplary embodiment, internal cracks 12 are formed along the longer side of each of the chips, that is, along the predetermined cutting line C1 set to be in a first cutting direction so as to more surely separate special chips. Subsequently, internal cracks 12 are formed along the shorter side of each of the chips, that is, along the predetermined cutting line C2 set to be in a second cutting direction. At that time, according to at least one exemplary embodiment, the laser light L can be concentrated to the internal processing region set at a given depth inside the substrate while the predetermined cutting lines C1 and C2 are visually checked.

As described above, the length of a crack formed at one light concentrating point varies, for example, ranges from about 2 μm to about 100 μm. The thickness of the substrate to be processed can also vary (e.g., about 625 μm). Thus, for cutting the substrate, one can perform the internal processing (or the internal property modification) a plurality of times. At one line concentrating point, the internal processing is started from a far side (e.g., 12a in FIG. 10A) from the front surface of the substrate (that is, started from an inner side of the substrate) to a closer side (e.g., 12b in FIG. 10A) to the front surface. When the internal processing is performed to form internal cracks, the processing is performed so that an internal crack formed in the vicinity of the substrate surface does not reach the substrate surface, which has the surface-processing traces 11a (FIG. 6). Processing conditions enabling internal cracks, which have already been formed close to the light concentrating point, to grow under the influence of heat generated by irradiation of laser light and to reach the substrate surface are not selected.

The internal crack can be parted into the cracks 12a to 12c in the direction of depth, as shown in FIG. 1. Alternatively, the internal cracks 12a to 12c can be coupled together. The internal crack 12c closest to the substrate surface 11 is formed at varying depth (e.g., a depth ranging from 10 μm to 100 μm) from the substrate surface 11 of the substrate and in such a position that the internal crack 12c does not connect with the surface-processing trace 11a.

Next, an order of processing groups of cracks is described below.

Figure 10A:
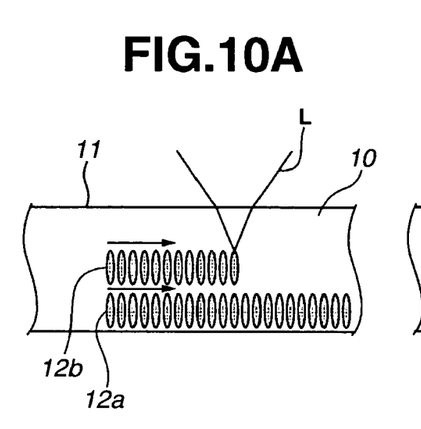
FIGS. 10A to 10D are explanatory views illustrating laser scanning methods employed to form a group of cracks at different depths.
Figures 10B, 10D:
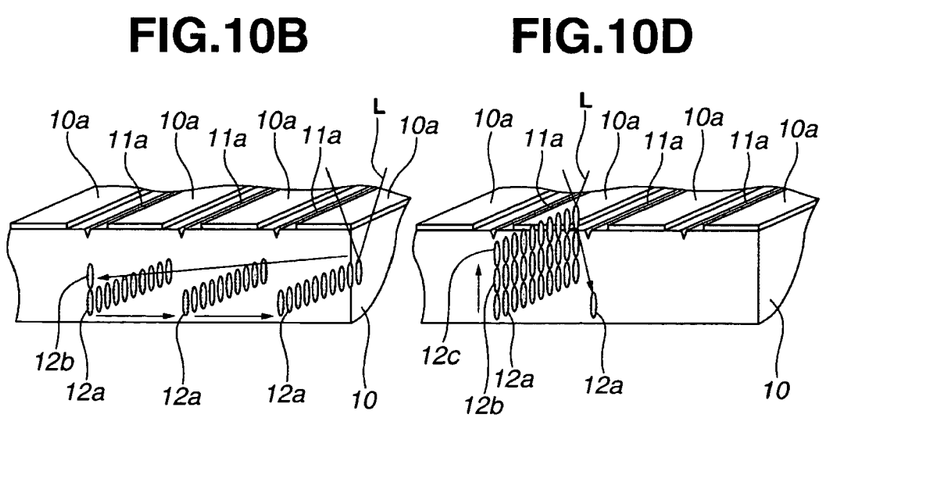
Figure 10C:
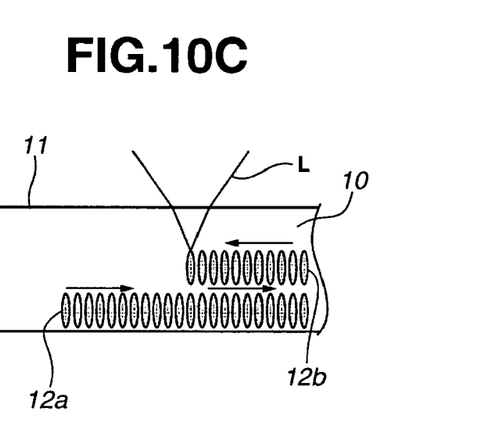

A first exemplary method, is illustrated in FIGS. 10A, 10B, and 10C, for forming a group of cracks at a certain depth from the surface. For example, a group of the internal cracks 12a can be formed at substantially the same depth corresponding to a plurality of or all of the predetermined cutting lines C. Then the formation of a group of the internal cracks 12b at a different depth can be performed. The formation of the groups of the cracks at each depth can be performed inside the substrate 10 in stages. Thus, the influence of the adjacent predetermined cutting lines C can be reduced.

According to a second exemplary method, as illustrated in FIG. 10D, upon completion of forming the groups of the internal cracks 12a, 12b, and 12c at different depths inside the substrate just under one of the predetermined cutting lines C, the formation of a group of similar cracks corresponding to another predetermined cutting line C is performed. According to this method, the number of times of performing the automatic focusing operations on the substrate surface at a processing starting point can be reduced in a case where the error in the focal position for planarity of the substrate 10 is reduced.

There can be two or more modes of performing the first method. In a first mode, the light concentrating point is moved along the predetermined cutting line C in one orientation, as illustrated in FIG. 10A. In a second mode, the light concentrating point is reciprocated along the predetermined cutting line C, as illustrated in FIG. 10C. In the second mode, a total of moving distance of the light concentrating point is reduced. Thus, the processing time can be decreased.

At least one exemplary embodiment employs the second mode. The mode to be selected is determined by comprehensively taking into consideration the conditions of an object (for example, the parallelism of the substrate or the undulation of the surface thereof).

When such laser processing is performed, according to at least one exemplary embodiment, even in a case where the surface of the substrate is not flat, the substrate surface irradiated with laser light can be observed by automatically focusing on such a substrate surface at a given position in the XY-plane. Thus, the position to which laser light is irradiated in the XY plane can accurately be displaced along the predetermined cutting line. Contemporaneously, while focusing for observation is performed on the surface irradiated with laser light, the processing laser light L can be concentrated to a position at an optional depth inside the substrate. Consequently, fine processing as illustrated in FIGS. 10A to 10D can precisely be performed with an accuracy of an order of μm.

As illustrated in FIG. 9, there is a point C12 of intersection between the predetermined cutting lines C1 and C2 respectively corresponding to two cutting directions. In the vicinity of the point C12 of intersection, an internal processing band formed along a first cutting direction interrupts laser beams used to perform internal processing at the same depth in a second cutting direction. This phenomenon does not occur in the entirety of an internal processing band extending in the second cutting direction. However, this phenomenon can occur locally. In at least one exemplary embodiment, the processing conditions can be changed in the proximity of the point C12 of intersection by taking the energy loss into consideration. Alternatively, the processing conditions are changed when an object to be processed is changed to the processing band corresponding to the second cutting direction. Then, the processing is performed over the entire processing band corresponding to the second cutting direction at processing conditions differing from those corresponding to the first cutting direction. Even in the case of such processing, the formation of an internal processing region can accurately be performed at an optional depth while the position of the point C12 of intersection is checked visually and by device.

In the substrate 10 in which the surface-processing traces 11a and the plurality of internal cracks 12a, 12b, and 12c are formed corresponding to each of the predetermined cutting lines C, at least the surface-processing trace 11a and the internal crack 12c formed just under the surface-processing trace 11a are not connected to each other. Thus, individual logic element portions 10a are not yet separated from the substrate 10 subjected to the laser processing. Accordingly, the substrate 10 held in this state is cut into device chips by the following step.

Cutting Step

After the surface-processing traces 11a and the internal cracks 12 are formed, the substrate 10 mounted on the dicing tape T is put on an elastic rubber sheet (e.g., made of silicone rubber or fluorocarbon rubber) in a cutting apparatus such that the back surface of the substrate 10 is turned up. Subsequently, the substrate 10 is pressed through the dicing tape T with an appropriate force (e.g., by a stainless steel roller). Thus, the cutting of the substrate 10 into device chips is performed.

Consequently, cracks are produced from a starting point that is the surface-processing trace 11a. The cracks develop to the back surface of the substrate 10 by connecting the internal cracks 12a, 12b, and 12c formed by the laser processing inside the substrate 10. Thus, the cracks reach the back surface of the substrate 10. Consequently, the substrate 10 is cut into parts along the predetermined cutting line C1. While the development of the cracks occurs along the crystal orientation of the substrate 10, the cutting of the substrate is caused by the connection of the cracks with the surface-processing trace 11a. Therefore, an actual cut line does not largely deviate from the predetermined cutting line C1 on the substrate surface 11.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2004-335395 filed Nov. 19, 2004, which is hereby incorporated by reference herein.

What is claimed is:

1. A laser processing apparatus for processing an object to be processed by concentrating a laser light to the object to be processed, the laser processing apparatus comprising:
   a stage configured to hold the object to be processed;
   a first optical system having a laser light concentrating position adjustment device for adjusting a concentrating position of a laser light for processing;
   a second optical system configured to guide a laser light for observation to the object to be processed, the second optical system having an automatic focusing mechanism for adjusting a focal position of the second optical system; and
   an objective lens shared by the first optical system and the second optical system and configured to face a surface of the object to be processed,
   wherein, while the object to be processed is processed, the automatic focusing mechanism drives the objective lens to maintain a distance between the objective lens and the surface of the object to be processed so that a focal position of the laser light for observation is adjusted on the surface of the object to be processed, and the concentrating position of the laser light for processing is adjusted by the laser light concentrating position adjustment device.

2. The laser processing apparatus according to claim 1, wherein the laser light concentrating position adjustment device includes an afocal optical subsystem, and wherein the laser light concentrating position adjustment device displaces a laser light concentrating position by changing an angle of emergence of a light beam emerging from the afocal optical subsystem.

3. The laser processing apparatus according to claim 2, wherein the afocal optical subsystem changes the angle of emergence of the emerging light beam by displacing a lens constituting the afocal optical subsystem in a direction of an optical axis of the first optical system.

4. A laser processing method for processing an object to be processed by concentrating a laser light to the object to be processed, the laser processing method comprising the steps of:
   holding the object to be processed on a stage;
   irradiating the object to be processed with a laser light for processing through a first optical system having a laser light concentrating position adjustment device for adjusting a concentrating position of the laser light for processing; and
   guiding a laser light for observation to the object to be processed through a second optical system having an automatic focusing mechanism for adjusting a focal position of the second optical system,
   wherein the first optical system and the second optical system share an objective lens, the objective lens configured to face a surface of the object to be processed, and
   wherein, while the object to be processed is processed, the automatic focusing mechanism drives the objective lens to maintain a distance between the objective lens and the surface of the object to be processed so that a focal position of the laser light for observation is adjusted on the surface of the object to be processed, and the concentrating position of the laser light for processing is adjusted by the laser light concentrating position adjustment device.

5. The laser processing method according to claim 4, wherein the laser light concentrating position adjustment device includes an afocal optical subsystem, and wherein the laser light concentrating position adjustment device displaces a laser light concentrating position by changing an angle of emergence of a light beam emerging from the afocal optical subsystem.

6. The laser processing method according to claim 5, wherein the afocal optical subsystem changes the angle of emergence of the emerging light beam by displacing a lens constituting the afocal optical subsystem in a direction of an optical axis of the first optical system.

* * * * *